United States Patent [19]

Cruickshank

[11] 3,773,491
[45] Nov. 20, 1973

[54] HERBICIDAL DI HYDROBENZOFURANYLUREA

[75] Inventor: Philip Alexander Cruickshank, Princeton, N.J.

[73] Assignee: FMC Corporation, New York, N.Y.

[22] Filed: Nov. 23, 1970

[21] Appl. No.: 92,861

[52] U.S. Cl. .............................. 71/88, 260/346.2 R
[51] Int. Cl. .............................................. A01n 9/28
[58] Field of Search .................... 71/88; 260/346.2 R

[56] References Cited
UNITED STATES PATENTS
2,992,232   7/1961   Bloom ............................ 260/330.5
3,393,209   7/1968   Majewski ............................. 71/88

FOREIGN PATENTS OR APPLICATIONS
1,431,521   1/1966   France ................................. 71/88

*Primary Examiner*—Lewis Gotts
*Assistant Examiner*—Catherine L. Mills
*Attorney*—Henry R. Ertelt, Eugene G. Seems and Pauline Newman

[57] ABSTRACT

A new class of chemical compounds, of the formula:

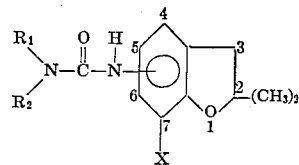

where the ureido group is in the 5- or 6-position; X is H, F, Cl, Br, I, -CH$_3$, or -CF$_3$; R$_1$ is H or -CH$_3$; R$_2$ is a lower alkyl of one to five carbon atoms; has selective pre- and post-emergence herbicidal activity. The synthesis of a preferred member of this class, 1,1-dimethyl-3-(2,3-dihydro-2,2-dimethylbenzofuran-5-yl)urea, is described in detail, and its utility is exemplified in both preemergence and post-emergence applications.

6 Claims, No Drawings

HERBICIDAL DI HYDROBENZOFURANYLUREA

FIELD OF THE INVENTION

This invention pertains to the general field of herbicides, and particularly to compositions which selectively control plant growth.

DESCRIPTION OF THE PRIOR ART

A substantial need continues to exist for herbicides with selectively in both pre- and post-emergence applications. It is known that certain urea derivatives exhibit herbicidal activity of varying types. However, the outstanding plant responses in selective pre-emergence and post-emergence herbicidal activity of the compounds of the present invention have not previously been reported or suggested in the art.

SUMMARY OF THE INVENTION

This invention pertains to novel herbicidal compounds, to new herbicidal compositions, and to new methods for the selective control of undesired plant growth. Particularly useful control of undesired plant growth is obtained in the presence of such crops as corn and small grain. Said compositions may be applied and utilized by commonly accepted methods.

DETAILED DESCRIPTION OF THE INVENTION:

The new herbicidal compounds of this invention are of the formula:

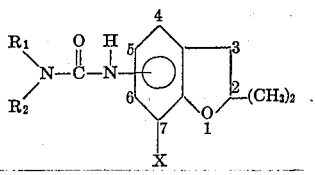

where the ureido group is in the 5- or 6-position; X is H, F, Cl, Br, I, -CH$_3$, or -CF$_3$; R$_1$ is H or -CH$_3$; R$_2$ is a lower alkyl of one to five carbon atoms. These compounds, when formulated as an essential active ingredient of herbicidal compositions, and utilized in either pre-emergence or post-emergence application, have excellent herbicidal properties.

The preparation of a preferred member of this class, 1,1-dimethyl-3-(2,3-dihydro-2,2-dimethylbenzofuran-5-yl)urea, is illustrated below. All temperatures are expressed in degrees centigrade. All parts and percentages are by weight.

EXAMPLE 1 — SYNTHESIS of 1,1-Dimethyl-3-(2,3-dihydro-2,2-dimethylbenzofuran-5-yl)urea The intermediate 5-amino-2,3-dihydro-2,2-dimethylbenzofuran, a known compound, was prepared as described in U. S. Pat. No. 2,383,264, issued Aug. 21, 1945. A mixture of 5.0 g. of 5-amino-2,3-dihydro-2,2-dimethylbenzofuran and 3.5 g. of freshly distilled dimethylcarbamoyl chloride in 100 ml. of benzene was stirred at room temperature for about 60 hours. The reaction mixture was filtered, and 3.0 g. of crude product (m.p. 126°–130°) was precipitated from the filtrate by addition of petroleum ether.

The reaction was repeated, but with addition of 5 ml. of triethylamine to act as an HCl acceptor. The reaction mixture was filtered and 2.7 g. of crude product (m.p. 128°–133°) was precipitated from the filtrate by addition of petroleum ether. The two products were combined and were recrystallized by dissolving in 30 ml. of hot isopropanol and precipitating with 100 ml. of petroleum ether to give 3.1 g. of 1,1-dimethyl-3-(2,3-dihydro-2,2-dimethylbenzofuran-5-yl)urea; m.p. 134°–136°.

Analysis:
Calc. for C$_{13}$H$_{18}$N$_2$O$_2$: C 66.64, H 7.74, N 11.96;
Found: C 66.94, H 7.99, N 12.17.

The structure was verified by nuclear magnetic resonance spectrum.

EXAMPLE 2 — Alternate SYNTHESIS

In an alternative method of synthesis, 60.0 g. of 5-amino-2,3-dihydro-2,2-dimethylbenzofuran in 200 ml. of benzene was added to 500 ml. of a solution of 62.5 g. of phosgene in benzene, maintained in an ice bath. The ice bath was removed after 5 minutes and the mixture was stirred slowly for about 18 hours at room temperature, and refluxed for an hour to drive off hydrogen chloride and unreacted phosgene. Further evaporation to remove solvent yielded 71 g. of crude product, shown by nuclear magnetic resonance spectrum to be nearly pure 2,3-dihydro-5-iso-cyanato-2,2-dimethylbenzofuran.

Analysis:
Calc. for C$_{11}$H$_{11}$NO$_2$: C 69.82, H 5.86, N 7.40;
Found: C 69.32, H5.72, N 7.27.

With no further purification, 12 g. of this product was dissolved in 40 ml. of diethylether, and this solution was added to 50 ml. of dimethylamine at dry ice temperature. The temperature was allowed to rise to room temperature, with stirring, and stirring continued for about 18 hours. Product filtered from the resulting suspension was washed with petroleum ether and weighed 12.0 g.; m.p. 130°–132°. Recrystallization from a hot solution containing a mixture of 60 ml. of isopropanol and 150 ml. of petroleum ether yielded 10.0 g. of 1,1-dimethyl-3-(2,3-dihydro-2,2-dimethylbenzofuran-5-yl)urea; m.p. 137°–138°. The structure was verified by nuclear magnetic resonance spectrum.

Analysis:
Calc. for C$_{13}$H$_{18}$N$_2$O$_2$ : C 66.64, H 7.74, N 11.96;
Found: C 66.63, H 7.72, N 11.70.

For herbicidal applications, the active ingredients of this invention may be utilized in diverse formulations, including the adjuvants and carriers normally employed to facilitate the dispersion of active ingredients in agricultural applications, recognizing the fact that the formulation and mode of application of a toxicant may affect the activity of the material in a given application. Thus, a benzofuranylurea of this invention may be formulated as a granule of relatively large particle size, as a powdery dust, as a wettable powder, as an emulsifiable concentrate, as a solution, or as any of several other known types of formulations, depending on the desired mode of application. For pre-emergence application, these herbicidal compositions are usually applied either as sprays, dusts or granules in the area in which control of vegetation is desired. For post-emergence control of established plant growth, sprays or dusts are most commonly used. These formulations may contain as little as 0.5 percent or as much as 95 percent or more by weight of active ingredient.

Dusts are admixtures of the active ingredient with finely divided solids such as talc, attapulgite clay, kieselguhr and other organic and inorganic solids which act as dispersants and carriers for the toxicant; these finely divided solids have an average particle size of less than about 50 microns. A typical dust formulation, useful herein, is one containing 1.0 part of a benzofuranylurea of this invention and 99.0 parts of talc.

Wettable powders, also useful formulations for both pre- and post-emergence herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5 percent to 80 percent of active ingredient, depending on the absorbency of the carrier, and usually also contain a small amount of a wetting, dispersing or emulsifying agent to facilitate dispersion. For example, a useful wettable powder formulation contains 80.8 parts of a benzofuranylurea of this invention, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of a benzofuranylurea of this invention with a liquid or solid emulsifying agent, or may also contain a liquid carrier, such as xylene, heavy aromatic naphthas, isophorone and other nonvolatile organic solvents. For herbicidal application, these concentrates are dispersed in water or other liquid carrier, and normally applied as a spray to the area to be treated. The percentage by weight of the essential active ingredient may vary according to the manner in which the composition is to be applied, but in general comprises 0.5 to 95 percent of active ingredient by weight of the herbicidal composition.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1 to 15 percent by weight of the herbicidal composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low-boiling dispersant solvent carrier such as the Freons, may also be used.

The selective pre-emergence and post-emergence herbicidal activity of a preferred compound of this invention is particularly striking at relatively low dosages, as illustrated in the following example:

EXAMPLE 3 — SELECTIVE HERBICIDAL ACTIVITY

The pre-emergence herbicidal activity of 1,1-dimethyl-3(2,3-dihydro-2,2-dimethylbenzofuran-5-yl)urea at low dosages was demonstrated as follows: In flat pans containing sandy-loam soil were planted seeds of representative plantt species. 24 hours after planting, the toxicant was sprayed on the soil as an acetone-water solution, at rates equivalent to 0.125, 0.25, 0.5, 1.0, 2.0, and 4.0 pounds per acre. Both the treated flats and an untreated control were maintained in a greenhouse and watered regularly for four weeks, after which time the performance of the toxicant was assessed in terms of percent kill with respect to the untreated control. Results are presented in Table 1.

Post-emergence herbicidal activity was demonstrated as follows: In flat pans containing sandy-loam soil were planted seeds of representative plant species, the flats were watered, and the seeds were allowed to grow in the greenhouse for about 2 weeks. The stand of plants was then sprayed with a solution of 1,1-dimethyl-3-(2,3-dihydro-2,2-dimethylbenzofuran-5-yl)urea in aqueous acetone, at rates equivalent to 0.125, 0.25, 0.5, 1.0, 2.0, and 4.0 pounds per acre. Both the treated flats and an untreated control were maintained in a greenhouse for four additional weeks, after which the number of surviving plants were counted and the percent kill with respect to the untreated control was determined. Results are presented in Table 2.

TABLE 1.—SELECTIVE HERBICIDAL ACTIVITY

[Pre-emergence Application]

| Test plant species | Percent kill at— | | | | | |
|---|---|---|---|---|---|---|
| | 0.125 lb./a. | 0.25 lb./a. | 0.5 lb./a. | 1.0 lb./a. | 2.0 lb./a. | 4.0 lb./a. |
| Corn | 0 | 0 | 0 | 0 | 40 | 60 |
| Lettuce | 100 | 20 | 80 | 100 | 100 | 100 |
| Mustard | 100 | 60 | 100 | 100 | 100 | 100 |
| Crab grass | 30 | 0 | 80 | 100 | 100 | 100 |
| Barnyard grass | 0 | 0 | 0 | 80 | 90 | 100 |
| Cotton | 0 | 0 | 100 | 100 | 100 | 100 |
| Tomato | 100 | 100 | 100 | 100 | 100 | 100 |
| Rice | 60 | 20 | 20 | 90 | 100 | 100 |
| Red clover | 100 | 100 | 100 | 100 | 100 | 100 |
| Sugar beets | 95 | 100 | 100 | 95 | 95 | 100 |
| Wild oats | 20 | 40 | 100 | 100 | 100 | 100 |

TABLE 2.—SELECTIVE HERBICIDAL ACTIVITY

[Post-emergence Application]

| Test plant species | Percent kill at— | | | | | |
|---|---|---|---|---|---|---|
| | 0.125 lb./a. | 0.25 lb./a. | 0.5 lb./a. | 1.0 lb./a. | 2.0 lb./a. | 4.0 lb./a. |
| Corn | 0 | 0 | 0 | 20 | 100 | 100 |
| Lettuce | 100 | 100 | 100 | 100 | 100 | 100 |
| Mustard | 100 | 100 | 100 | 100 | 100 | 100 |
| Crab grass | 30 | 95 | 80 | 100 | 100 | 100 |
| Barnyard grass | 40 | 95 | 70 | 100 | 100 | 100 |
| Cotton | 100 | 100 | 100 | 100 | 100 | 100 |
| Tomato | 100 | 100 | 100 | 100 | 100 | 100 |
| Rice | 100 | 100 | 100 | 100 | 100 | 100 |
| Red clover | 100 | 100 | 100 | 100 | 100 | 100 |
| Sugar beets | 100 | 100 | 100 | 100 | 100 | 100 |
| Wild oats | 100 | 100 | 100 | 100 | 100 | 100 |

The results shown in Tables 1 and 2 demonstrate the outstanding selectivity of this novel herbicide in favor of corn in both pre-emergence and post-emergence application.

The active herbicidal compounds of this invention have further shown herbicidal activity in favor of wheat, barley, soybeans, sorghum, and peanuts in preemergence application, and in favor of wheat and barley in post-emergence application.

The active herbicidal compounds of this invention may be formulated and/or applied with insecticides, fungicides, nematocides, plant growth regulators, fertilizers, and other agricultural chemicals. In applying the active compounds of this invention, whether formulated alone or with other agricultural chemicals, an effective amount of the benzofuranylurea of this invention is of course employed.

It is apparent that various modifications may be made in the formulation and application of the novel compounds of this invention, without departing from the inventive concept herein, as defined in the following claims:

We claim:

1. Herbicidal composition comprising, as active ingredient, an effective amount of a compound of the formula:

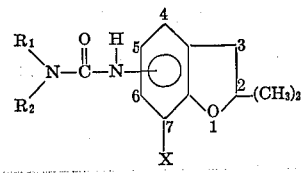

where the ureido group is in the 5- or 6-position of the condensed ring; X is H, F, Ce, Br, I, -CH$_3$, or -CF$_3$; R$_1$ is H or -CH$_3$; and R$_2$ is a lower alkyl of one to five carbon atoms; in admixture with an inert agricultural carrier.

2. Herbicidal composition comprising, as active ingredient, an effective amount of

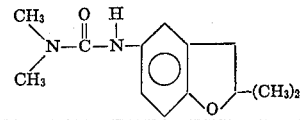

in admixture with an inert agricultural carrier.

3. Method of herbicidal control of undesired plant growth which comprises treating soil with an effective amount of a composition of claim 1.

4. Method of herbicidal control of undesired plant growth which comprises treating soil with an effective amount of the compositions of claim 2.

5. Method of herbicidal control of undesired plant growth which comprises treating plants with an effective amount of a composition of claim 1.

6. Method of herbicidal control of undesired plant growth which comprises treating plants with an effective amount of the composition of claim 2.

* * * * *

UNITED STATES PATENT OFFICE
CERTIFICATE OF CORRECTION

Patent No. 3,773,491          Dated November 20, 1973

Inventor(s) Philip Alexander Cruickshank

It is certified that error appears in the above-identified patent and that said Letters Patent are hereby corrected as shown below:

Column 6, line 2, "X is H, F, Ce," should read
-- X is H, F, Cl, --

Signed and sealed this 1st day of April 1975.

(SEAL)
Attest:

RUTH C. MASON
Attesting Officer

C. MARSHALL DANN
Commissioner of Patents
and Trademarks